United States Patent [19]

Raven

[11] 4,390,894

[45] Jun. 28, 1983

[54] NOISE SUPPRESSION CIRCUIT FOR A VIDEO SIGNAL

[75] Inventor: Johannes G. Raven, Eindhoven, Netherlands

[73] Assignee: U.S. Philips Corporation, New York, N.Y.

[21] Appl. No.: 288,235

[22] Filed: Jul. 27, 1981

[30] Foreign Application Priority Data

Aug. 20, 1980 [NL] Netherlands .......................... 8004697
Feb. 18, 1981 [NL] Netherlands .......................... 8100788

[51] Int. Cl.³ .............................................. H04N 5/21
[52] U.S. Cl. ........................................................ 358/36
[58] Field of Search ................................... 358/36, 167

[56] References Cited

U.S. PATENT DOCUMENTS 4,058,836 11/1977 Drewery .............................. 358/36
4,223,341 9/1980 Drewery .............................. 358/36
4,232,340 11/1980 Fuhrer ................................. 358/36

FOREIGN PATENT DOCUMENTS 2845591 8/1979 Fed. Rep. of Germany ........ 358/36

Primary Examiner—Michael A. Masinick
Attorney, Agent, or Firm—Jack Oisher; William J. Streeter; Edward W. Goodman

[57] ABSTRACT

In a noise suppression circuit for a video signal, the input video signal is separated into its high and low frequency components by a separating circuit (3). The signal at an output (15) of a delay circuit (17) is combined with the separated low frequency signal in a combining circuit (11) whose output is applied to the input (19) of the delay circuit (17). The time delay of the delay circuit (17) is switched from field to field by means of a change-over switch (53) so that this time delay changes from field to field to a field period minus and a field period plus half a line period. The noise-suppressed low frequency output from the combining circuit (11) is added to the separated high frequency component in an adder circuit (25). In use such a noise suppression circuit produces substantially no travelling noise patterns on a television display.

4 Claims, 4 Drawing Figures

NOISE SUPPRESSION CIRCUIT FOR A VIDEO SIGNAL

BACKGROUND OF THE INVENTION

The invention relates to a noise suppression circuit for a video signal, comprising a delay circuit having a time delay of substantially one field period and a combining circuit in which an output signal of the delay circuit is combined with an input signal.

U.S. Pat. No. 4,058,836 discloses a noise suppression circuit of the above-described type. Compared with a noise suppression circuit comprising a delay circuit having a time delay of one picture period, a considerable saving in circuitry is realized with only a very little lower noise suppression. Such a noise suppression circuit appears, however, to produce on displays travelling noise patterns.

SUMMARY OF THE INVENTION

It is an object of the invention to substantially avoid or at least substantially reduce these travelling noise patterns.

The invention provides a noise suppression circuit of the type described in the opening paragraph and which is characterized in that the actual time delay of the delay circuit is switchable between one field period minus half a line period for alternate field scanning periods, and one field period plus half a line period for the intervening field scanning periods.

It appears that, when a delay circuit with the above-described alternating time delay is used, substantially no travelling noise patterns occur in the picture, while the noise suppression is almost equal to the suppression realized by means of a noise suppression circuit comprising a delay circuit having a time delay of one picture period.

DESCRIPTION OF THE DRAWINGS

The invention will now be further explained by way of non-limitative examples with reference to the accompanying drawings.

In the drawings.

DESCRIPTION OF THE PREFERRED EMBODIMENT

Figure 1:
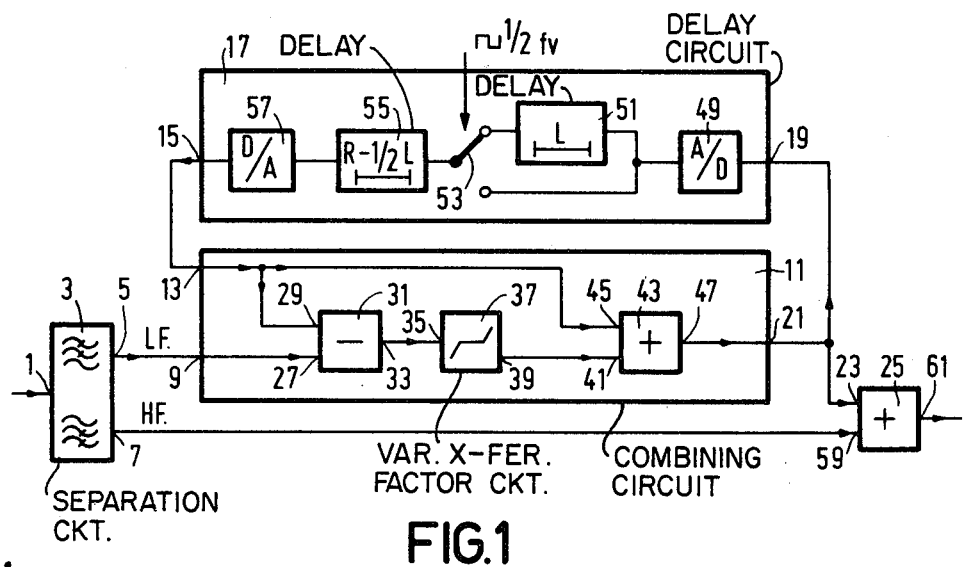
FIG. 1 illustrates by means of a block schematic circuit diagram a noise suppression circuit according to the invention for a monochrome video signal or a color difference signal.

In FIG. 1 a video signal is applied to an input 1 of a separation circuit 3. The separation circuit 3 divides this signal into a low-frequency component, for example up to approximately MHz for a monochrome signal or up to approximately 500 kHz for a color difference signal, which becomes available at an output 5, and into a high-frequency component which becomes available at an output 7.

The low-frequency component is applied from the output 5 of the separation circuit 3 to an input 9 of a combining circuit 11, which has a further input 13 which is connected to an output 15 of a delay circuit 17. An input 19 of the delay circuit 17 is connected to an output 21 of the combining circuit which is further connected to an input 23 of an adder circuit 25.

With the combining circuit 11, the delay circuit 17 forms a noise suppression circuit which in this case is only operative for the low-frequency component of the video signal. This is usually sufficient, for example for use in television receivers, since the low-frequency noise is most annoying in these receivers.

In the combining circuit 11 the undelayed and the delayed low-frequency component from the inputs 9 and 13, respectively are applied to inputs 27 and 29, respectively, of a subtracting circuit 31, an output 33 of which is connected to an input 35 of a circuit 37 having a variable transfer factor. The circuit 37 with the variable transfer factor may be a non-linear circuit passing signals of a small amplitude with a higher attenuation than signals having a larger amplitude, or it may be a circuit the attenuation of which is controlled by means of a control signal which is obtained from the video signal or one of its components by, for example, a movement detector.

An output 39 of the variable transfer factor circuit 37 is connected to an input 41 of an adder circuit 43, which has a further input 45 connected to the input 13 and an output 47 connected to the output 21 of the combining circuit 11. The operation of the combining circuit is known from, for example, U.S. Pat. No. 4,058,836, so that no further description is necessary.

In the delay circuit 17 the signal applied to the input 19 is converted by an analog-to-digital converter 49 into a digital signal and applied on the one hand directly and on the other hand via a delay line 51, having a time delay of one line period (L), to a change-over switch 53, which is operated by a signal of half the field frequency ($\frac{1}{2}f_v$) and which is in the position shown in the drawing for one field scanning period and in the other position for the subsequent field scanning period. Via the change-over switch 53, the digital signal is passed through a delay line 55 having a time delay of one field period minus half a line period ($R - \frac{1}{2}L$) and is further applied to the output 15 via a digital-to-analog converter 57. Consequently, the delay circuit has alternately for one field, a time delay of one field period minus half a line period ($R - \frac{1}{2}L$), and for the next field a delay of one field period plus half a line period ($R + \frac{1}{2}L$), which prevents travelling noise patterns from occurring in a picture to be displayed from the video signal, while yet the noise suppression is only slightly lower than that which would be obtained with, for example, a delay circuit having a time delay of two field periods, so that a considerable savings in circuitry can be achieved.

The low-frequency component of the video signal in which the noise has been suppressed appears at the input 23 of the adder circuit 25. The high-frequency component coming from the output 7 of the separation circuit 3 is applied to a further input 59 of the adder circuit 25, so that a complete video signal is produced again at an output 61 thereof in which the low-frequency noise has been suppressed.

In the above-described construction, in which the noise is only suppressed in the low-frequency component, a further savings in circuitry is accomplished and the analog-to-digital converter 49 can be sampled at a relatively low frequency and the delay lines 51 and 55 may comprise much fewer storage elements than for the case in which the whole video signal must be passed through them.

It will be clear that, if so desired, noise suppression may be applied to the whole video signal.

It will further be clear that instead of a recursive noise suppression circuit as described here, a transversal noise suppression circuit may be used, if so desired.

Figure 2:
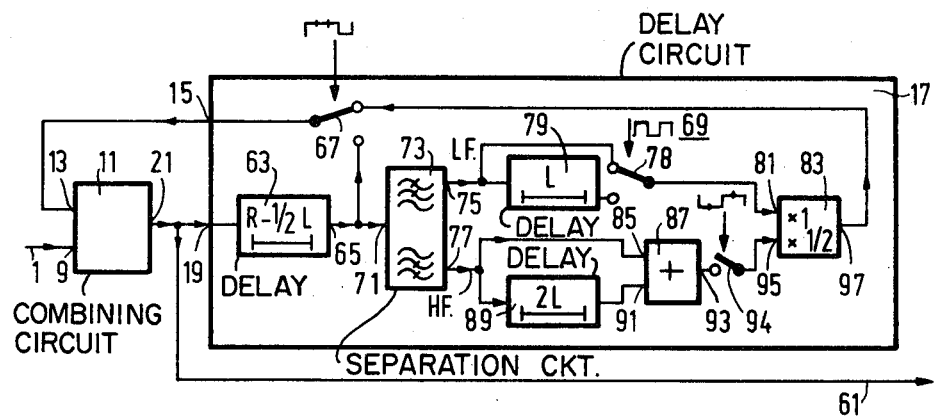
FIG. 2 illustrates by means of a block schematic circuit diagram a noise suppression circuit according to the invention for a composite N.T.S.C. video signal.

In FIG. 2 components corresponding with those of FIG. 1 have been given the same reference numerals. For the description of these components reference is made to the description of FIG. 1. Any conversions from analog into digital and vice-versa are not described.

In FIG. 2, the input 1 of the circuit is directly connected to the input 9 of the combining circuit 11. A composite N.T.S.C. video signal, comprising a luminance signal Y and a chrominance signal CHR$_{NTSC}$, is now applied to the input 1.

The delay circuit 17 is adapted to the processing of this signal and comprises a delay line 63, which is connected to the input 19 and has a time delay of one field period minus half a line period (R−½L). An output 65 of the delay line 63 is connected to one of the terminals of a change-over switch 67, on the one hand, and on the other hand, to the other terminal of the change-over switch 67 via a circuit 69, in which the phase of the chrominance signal is adapted. The output 65 of the delay line 63 is connected there to an input 71 of a separation circuit 73 which produces at an output 75 the low-frequency component and at an output 77 the high-frequency component of the signal at its input 71.

The low frequency component is applied from the output 75 to an input 81 of a summing circuit 83 alternately, via a delay line 79 having a time delay of one line period L, and directly, by means of a switch 78.

The high-frequency component which also contains the chrominance signal is applied from the output 77 of the separation circuit 73 to an interpolation circuit which has a direct signal path to an input 85 of an adder circuit 87 and a signal path comprising a delay line 89 having a time delay of two line periods (2L) to a further input 91 of the adder circuit 87. This interpolation circuit keeps the phase of the chrominance signal equal to the phase at the input 19 of the delay line 63 but produces by means of interpolation a signal which, as regards its delay, substantially corresponds to the low-frequency signal.

The adder circuit 87 has an output 93 which is connected via a switch 94 to an input 95 of the summing circuit 83, which halves the amplitude of the signal at the input 95 and adds this half-amplitude signal to the signal at the input 81 thereof. During the first three field periods the change-over switch 67 is always in the position shown and during the fourth field period in the position not shown in the drawing. During the first and the third field periods the switch 78 is always in the position not shown and during the second and the fourth field periods in the position shown. During the first and the second field periods the switch 94 is always in the position not shown and during the third and fourth field periods in the position shown. This cycle recurs every four field periods, as a result of which the chrominance signal always has the correct phase.

Hence the noise suppression in this circuit is operative on the whole video signal. From the output 21 of combining circuit 11, the signal in which the noise has been suppressed is applied to the output 61 of the circuit.

The circuit 69 for adapting the phase of the chrominance signal may also be of an alternative construction, for example by replacing the change-over switch 67 by an adder circuit which adds the output signals of two change-over switches together, one switch switching between the input and the output of the delay line 79 and the other switch switching between the input and the output of the delay line 89, the last-mentioned switch, switching for example with half the field frequency and consequently assuming a different position from field to field, while the other switch is in one position for one field out of four consecutive fields and is in the other position for the remaining three fields, the two switches through-connecting the outputs of the delay lines 79, 89 to the adder circuit during this one field out of the four fields.

Figure 3:
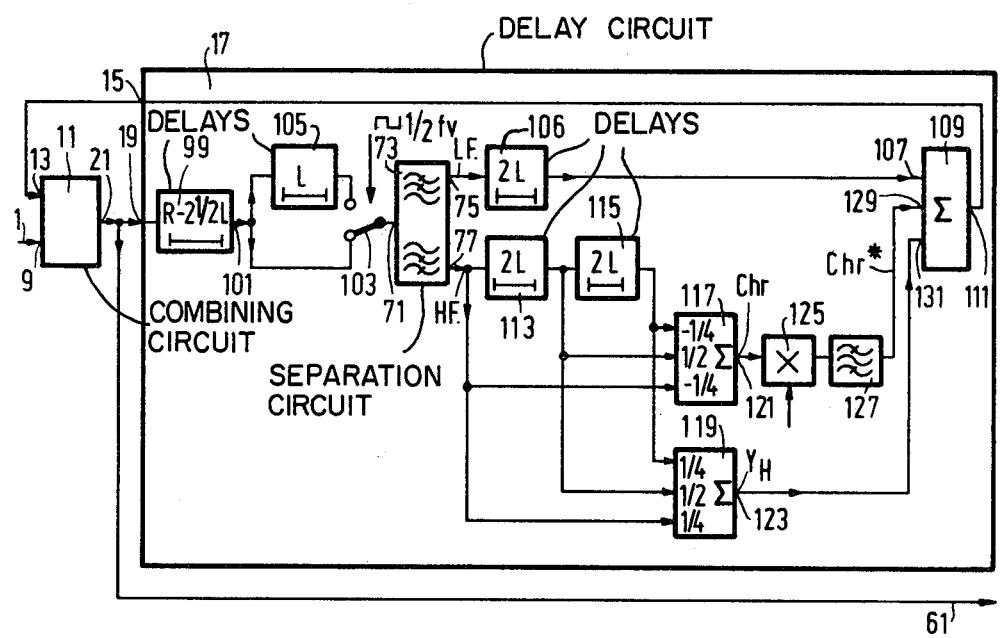
FIG. 3 illustrates by means of a block schematic circuit diagram a noise suppression circuit according to the invention for a composite P.A.L. video signal.

In FIG. 3 corresponding components have been given the same reference numerals as in the preceding Figures.

A luminance signal Y and a PAL chrominance signal CHR$_{PAL}$ are now applied to the input 1.

In the delay circuit 17, the input 71 of the separation circuit 73 receives the signal coming from the input 19 via an output 101 of a delay line 99 having a time delay of one field period minus two and a half line periods R−2½L), on the one hand directly, and on the other hand via a delay line 105 having a time delay of one line period (L) by means of a change-over switch 103, which switches at half the field frequency. The change-over switch 103 is connected to the input 71 of the separation circuit 73.

The low-frequency component of the video signal is produced at the output 75 of the separation circuit 73 and the high-frequency component is produced at the output 77, each with, alternately, a time delay of one field period minus two and a half line periods and a field period minus one and a half line periods. Via a delay line 105 having a time delay of two line periods (2L), the output 75 is connected to an input 107 of a summing circuit 109, an output 111 of which is connected to the output 15 of the delay circuit 17. Hence the low-frequency component is alternately delayed for a field period less half a line period and a field period plus half a line period by the delay circuit 17.

From the output 77 the high-frequency component is split, by means of two comb filters having two delay lines 113, 115, each having a time delay of two line periods, and two summing circuits 117, 119, into a chrominance signal CHR, which is produced at an output 121 of the summing circuit 117, and a high-frequency luminance signal Y$_H$ produced at an output 123 of the summing circuit 119. These two signals correspond to a corresponding signal which has been delayed for two line periods with respect to the signal at the output 77 of the separation circuit 73. The phase of the chrominance signal at the output 121 of the summing circuit 117 is now further mirrored by a modifier 125. The mirrored chrominance signal CHR* is applied to an input 129 of the summing circuit 109 via a band-pass filter 127 and the high-frequency luminance signal Y$_H$ is applied to an input 131 of the summing circuit 109. There is now produced at the output 111 of the summing circuit 109 a signal which corresponds to a signal which has been delayed for, alternately, a field period minus half a line period and a field period plus half a line period with respect to the signal applied to the input 19 of the delay circuit 17 and in which the phase of the chrominance signal has been corrected, so that it can be added in the combining circuit 11 to the undelayed signal at the input 1.

In this case the delay circuit 17 may, if so desired, be replaced by a delay line having a time delay of one field period minus two and a half line periods (R−2½L), followed by a parallel arrangement of a high-frequency signal path having a switchable delay with a recurring cycle of, in this order, in consecutive fields, four, four, zero, four and zero line periods (4L, 4L, 0, 4L, 0) and in the low-frequency signal path a switchable delay with a recurring cycle of, in this order, in consecutive field two and three line periods (2L, 3L, . . . ).

Figure 4:
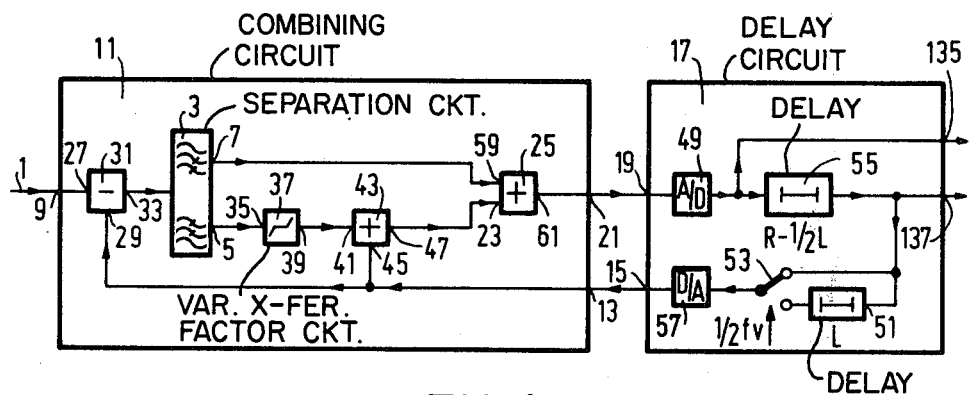
FIG. 4 illustrates by means of a block schematic circuit diagram a modification of the noise suppression circuit shown in FIG. 1 for a signal which must be delayed for one field period to make it suitable for further processing.

In FIG. 4 corresponding components have been given the same reference numerals as in FIG. 1. A number of components have been arranged differently compared with FIG. 1, thus making the circuit suitable for further signal processing operations for which a delay of, for example, a field period minus half a line period is required, as, for example, for a comb filter circuit for a PAL-signal for separating the chrominance and luminance signal components thereof.

The separation circuit 3 is now included after the output 33 of the subtracting circuit 31. The input 1 of the noise suppression circuit is connected to the input 9 of the combining circuit 11.

The low-frequency output 5 of the separation circuit 3 is now connected to the input 35 of the circuit 37 having the variable transfer factor.

Further, the adder circuit 25 is arranged before the output 21 of the combining circuit 11. The input 23 of said adder circuit is now only connected to the output 47 of the adder circuit 43 and the output 61 to the output 21 of the combining circuit 11.

The input and the output of the delay line 55, having a time delay of one field period minus half a line period, are connected to outputs 135 and 137, respectively, of the noise suppression circuit, which outputs may, for example, be connected to inputs of a comb filter circuit for separating the chrominance and luminance signal components of a PAL-signal when a PAL-signal is applied to the input 1.

The delay circuit 17 must then be suitable for passing the overall frequency range of the PAL signal.

The high-frequency portion of the signal at the input 1 is passed on to the input 19 of the delay circuit 17 via the subtracting circuit 31, the output 7 of the separation circuit 11 and the adder circuit 25. Via the delay circuit 17, this high-frequency portion does indeed reach the input 13 of the combining circuit but, as it is applied via the subtracting circuit 31, the adder circuit 43 and the adder circuit 25 with the opposite sign to the output 21 of the combining circuit 11, it has there become zero. So no delayed high-frequency signal portion is produced at said output 21.

The low-frequency portion of the signal at the input 1 is applied to the input 19 of the delay circuit 17 via the subtracting circuit 31, the circuit 37 having a variable transfer factor, the adder circuit 43 and the adder circuit 25 and appears delayed at the input 13 of the combining circuit 11. From there it is applied directly and via the subtracting circuit 33 and the circuit 37 having the variable transfer factor, to the adder circuit 43, so that it reaches the input 19 of the delay circuit 17 with an amplitude which depends on the transfer factor of the circuit 37. As a result thereof, a noise suppression occurs in the low-frequency portion.

Therefore at the outputs 135 and 137 of the delay circuit 17 there are produced PAL-signals which are delayed with respect to each other by a field period less half a line period (R−½L), the noise in the low-frequency portions of these signals being suppressed. Disturbing components in the chrominance and the luminance signals can be suppressed by means of a comb filter of which the delay circuit forms part.

It is assumed that the further processing of the digital signals is carried out at the outputs 135, 137. If so desired such a processing can be effected on analog signals by connecting the output 135 to the input of the analog-to-digital converter 49 and the output 137 to the output of the delay line 155 via a digital-to-analog converter.

It will further be obvious that the circuit of FIG. 4 is also suitable for other signals which must still be subjected to a processing operation for which a delay of approximately a field period minus half a line period is required.

What is claimed is:

1. A noise suppression circuit for a video signal, comprising a delay circuit having a time delay of substantially one field period and a combining circuit in which an output signal of the delay circuit is combined with an input signal, characterized in that the actual time delay of the delay circuit is switchable between one field period minus half a line period for alternate field scanning periods and one field period plus half a line period for the intervening field scanning period.

2. A noise suppression circuit as claimed in claim 1, characterized in that said noise suppression circuit further comprises a separation circuit for separating an applied video signal into a high-frequency component and a low-frequency component.

3. A noise suppression circuit as claimed in claim 2, for a PAL television signal, characterized in that the separation circuit forms part of said delay circuit and is arranged in a signal path after delay means having a time delay which is switchable from field to field between a field period minus two and a half line periods and a field period minus one and a half line periods.

4. A noise suppression circuit as claimed in claim 2, characterized in that the separation circuit is arranged in a signal path after a subtracting circuit, the inputs of which are respectively coupled to an input of the noise suppression circuit and to an output of the delay circuit, while a high-frequency output of the separation circuit is coupled to an input of an adder circuit a further input of which is connected to a low-frequency output of the separation circuit via a further adder circuit and a circuit having a variable transfer factor, while a further input of the further adder circuit is coupled to the output of the delay circuit.

* * * * *